US012723978B2

(12) United States Patent
Saito et al.

(10) Patent No.: US 12,723,978 B2
(45) Date of Patent: Sep. 1, 2026

(54) OPTICAL ANALYSIS DEVICE AND COMBINED ANALYSIS DEVICE

(71) Applicant: HORIBA Advanced Techno, Co., Ltd., Kyoto (JP)

(72) Inventors: Hiroshi Saito, Kyoto (JP); Tatsuya Nakahara, Kyoto (JP)

(73) Assignee: HORIBA ADVANCED TECHNO, CO., LTD., Kyoto (JP)

( * ) Notice: Subject to any disclaimer, the term of this patent is extended or adjusted under 35 U.S.C. 154(b) by 220 days.

(21) Appl. No.: 18/512,558

(22) Filed: Nov. 17, 2023

(65) Prior Publication Data

US 2024/0201082 A1 Jun. 20, 2024

(30) Foreign Application Priority Data

Dec. 16, 2022 (JP) ................................ 2022-200859

(51) Int. Cl.
*G01N 21/33* (2006.01)
*G01N 21/3577* (2014.01)
*G01N 27/06* (2006.01)

(52) U.S. Cl.
CPC ......... *G01N 21/3577* (2013.01); *G01N 21/33* (2013.01); *G01N 27/06* (2013.01)

(58) Field of Classification Search
None
See application file for complete search history.

(56) References Cited

U.S. PATENT DOCUMENTS 6,204,919 B1 * 3/2001 Barshad .................... G01J 3/02 356/326
10,168,281 B2 * 1/2019 Shoji ......................... G01J 3/36
2006/0092520 A1 * 5/2006 Buchsbaum .............. G01J 3/10 359/629
2006/0202133 A1 * 9/2006 Ok ........................ G01J 3/0218 250/458.1
2008/0174768 A1 * 7/2008 Belz ..................... C07D 487/04 356/73
2009/0098022 A1 * 4/2009 Tokhtuev .............. G01N 33/18 702/86

(Continued)

FOREIGN PATENT DOCUMENTS

JP 2021-139668 9/2021

*Primary Examiner* — Marcus H Taningco
(74) *Attorney, Agent, or Firm* — Greenblum & Bernstein, P.L.C.

(57) ABSTRACT

An optical analysis device that analyzes a sample by irradiating an optical cell containing the sample with light, and detecting light transmitted through the optical cell, the optical analysis device including: a first light source and a second light source each emitting light in a spectrum different from a spectrum of another; an optical element that reflects a part and transmits another part of incident light that has a first face on which the light from the first light source becomes incident and a second face on which the light from the second light source becomes incident; a first light output port provided on a light path of light emitted from the first light source and reflected on the first face, and light emitted from the second light source and transmitted through the second face; and a second light output port provided on a light path of light emitted from the first light source and transmitted through the first face.

9 Claims, 6 Drawing Sheets

(56) References Cited

U.S. PATENT DOCUMENTS

| | | | | |
|---|---|---|---|---|
| 2012/0280143 | A1* | 11/2012 | Kim | G01J 3/0229<br>250/208.2 |
| 2014/0361171 | A1* | 12/2014 | Disch | G01J 3/427<br>250/338.5 |
| 2018/0143173 | A1* | 5/2018 | Chang | A23N 12/02 |

* cited by examiner

Fig.4
HALOGEN LAMP
INFRARED RANGE
Wavelength
Intensity Counts

OPTICAL ANALYSIS DEVICE AND COMBINED ANALYSIS DEVICE

BACKGROUND OF THE INVENTION

1. Technical Field

The present invention relates to an optical analysis device that measures the concentration of a component in a chemical liquid or the like used in processes such as a semiconductor manufacturing process, and a combined analysis device including the optical analysis device.

2. Description of the Related Art

As an example of a conventional analysis device, there is an optical analysis device connected to piping provided to semiconductor manufacturing equipment, and measuring the concentration and the like of a chemical liquid (liquid sample), such as hydrofluoric acid (HF), as disclosed in JP 2021-139668 A. This optical analysis device includes an optical cell, a light emitter unit that irradiates the optical cell with light, and a photodetector unit that detects the light transmitted through the optical cell, and is configured to cause a calculation unit to calculate, upon receiving a light intensity signal from a photodetector, the concentration of a predetermined component of a liquid sample in the optical cell. The concentration thus obtained is used in controlling the concentration and the like of the chemical liquid flowing through the pipe.

PRIOR ART DOCUMENT

Patent Document

JP 2021-139668 A

SUMMARY OF THE INVENTION

In an optical analysis device such as that described above, it is desirable for one device to be capable of irradiating the optical cell with light in a wide range of wavelengths. A possible configuration of a light source unit for addressing this issue includes a deuterium lamp, which emits light in an ultraviolet range, and a halogen lamp, which emits light in a wavelength range from the visible light to the infrared. The light emitted from these light sources are then combined using an optical element such as a beam splitter configured to reflect a part of the light incident thereto and to transmit another part, and to output the combined light. With such a configuration, the optical element can extract light in the ultraviolet to infrared range, by reflecting the light of the halogen lamp and transmitting the light of the deuterium lamp, and combining the light, for example. Furthermore, by turning only one of these lamps ON, it is possible to extract one of the light in the visible-light range to infrared range, and the light in the ultraviolet range, selectively.

However, even if the light in different wavelength ranges can be extracted selectively from the light source units, there still remains another challenge that one photodetector is not quite capable of make measurements across the entire range of wavelengths, from ultraviolet to infrared, because the photodetector has a wavelength range suitable for its sensitivity. Furthermore, the configuration described above has another problem that the light output from the halogen lamp and transmitted through the optical element without being reflected thereon is wasted. Not only the configuration fails to make an effective use of the energy of the light source, but also unused light may become a source of radiant heat and a cause of a thermal effect.

The present invention has been made to solve the problems described above, and a main object of the present invention is to enable measurements across a wide range of wavelengths, to reduce a loss in the energy of the light source, and to make an effective use of the energy, in an optical analysis device that analyzes a sample by irradiating an optical cell containing the sample with light, and detecting the light transmitted through the optical cell.

In other words, an optical analysis device according to the present invention is an optical analysis device that analyzes a sample by irradiating an optical cell containing the sample with light, and detecting light transmitted through the optical cell, the optical analysis device including: a first light source and a second light source each emitting light in a spectrum different from a spectrum of another; an optical element that reflects a part and transmits another part of incident light, that has a first face on which the light from the first light source becomes incident and a second face on which the light from the second light source becomes incident; a first light output port provided on a light path of light emitted from the first light source and reflected on the first face, and light emitted from the second light source and transmitted through the second face; and a second light output port provided on a light path of light emitted from the first light source and transmitted through the first face.

With such a configuration, the light emitted from the first light source and reflected on the first face of the optical element and the light emitted from the second light source and transmitted through the second face of the optical element are combined, and the combined light is guided to the first light output port. Therefore, the first light output port can output the reflected light of the first light source, the transmitted light of the second light source, or the combination thereof, selectively, and the optical cell can be irradiated therewith selectively. Furthermore, because the light emitted from the first light source and transmitted through the first face of the optical element is guided to the second light output port, it becomes possible to make an effective use of the transmitted light of the first light source without any waste, and to irradiate the optical cell therewith. By allowing the light output from the first light output port and the light output from the second light output port to be detected using photodetectors each having a sensitive wavelength range suitable for the corresponding light, it becomes possible to make measurements across a wide range of wavelengths, e.g., from ultraviolet to infrared.

As described above, with the configuration according to the present invention, by using the optical element to combine the reflected light of the first light source and the transmitted light of the second light source, and also making an effective use of the light emitted from the first light source and transmitted through the optical element, not only it becomes possible to output the reflected light of the first light source, the transmitted light of the second light source, the combined light thereof, and the transmitted light of the first light source selectively, but also it becomes possible to inhibit a loss of the light source energy and to make measurements across a wide range of wavelengths.

In the optical analysis device described above, preferably, one of the first light source and the second light source emits light at a higher intensity than an intensity of light from the other.

In this manner, with the first light source and the second light source emitting light at different intensities, it become possible for the light having different wavelength characteristics to be output from the respective light output ports in a balanced manner, by also giving a consideration to a difference in reflectance and transmittance of the optical element. For example, when the optical element has a transmittance higher than the reflectance, the light intensity of the first light source may be set higher than that of the second light source.

As a specific aspect of the present invention, one of the first light source and the second light source includes a halogen lamp as a light source, and another includes a deuterium lamp as a light source.

As a specific aspect of the present invention, one of the first light source and the second light source emits light in a visible-light to infrared wavelength range, and the other emits light in an ultraviolet wavelength range.

According to such an aspect, it is possible to measure a wide range of wavelengths from the ultraviolet to infrared range.

Preferably, the optical element has a reflectance higher than the transmittance, or a transmittance higher than the reflectance, within the wavelength range of the light emitted from the first light source and the second light source.

Still preferably, in the optical analysis device, the optical element is implemented as a non-coated quartz plate.

When a half mirror, which is a planar glass with coating of dielectric multilayer film, is used as the optical element, for example, the materials included the dielectric multilayer film absorbs a large amount of light in the ultraviolet range, and therefore, deterioration may take place quickly. By using a non-coated quartz plate (that is, a quartz plate not applied with any coating) as the optical element, it is possible to suppress absorption of the light in the ultraviolet range by the optical element, and therefore, to inhibit the deterioration. In addition, because the non-coated quartz plate has an optical property that the transmittance is higher than the reflectance, this optical element allows the transmitted light of the deuterium lamp having a relatively low luminous energy and the reflected light of the halogen lamp having a relatively high luminous energy to be combined in a well-balanced manner, at an appropriate luminous energy ratio.

Preferably, the optical analysis device has the first light output port and the second light output port facing substantially the identical direction.

With this, because the first light output port and the second light output port face the same direction, optical fibers or the like for extracting the light can be connected easily.

In addition, preferably, the optical analysis device further includes: a first optical cell and a second optical cell irradiated with light output from the first light output port and light output from the second light output port, respectively; and a first photodetector and a second photodetector that detect light transmitted through the first optical cell and the light transmitted through the second optical cell, respectively, and each of which has a sensitive wavelength range different from a sensitive wavelength range of another.

With such a configuration, the light output from the first light output port and the light output from the second light output port can be detected by the photodetectors having suitable sensitive wavelength ranges, respectively, so that measurements can be collected across a wide range of wavelengths.

Note that "each of which has a sensitive wavelength range different from a sensitive wavelength range of another" means that the sensitive wavelength ranges are not the same, in other words, at least a part of the sensitive wavelength ranges do not overlap each other.

In a configuration in which one of the first light source and the second light source emits light in the wavelength range from the visible light to the infrared, and the other emits light in the ultraviolet wavelength range, preferably, one of the first photodetector and the second photodetector has the ultraviolet to the visible-light range as a sensitive wavelength range, and the other has the infrared range as a sensitive wavelength range.

Furthermore, the combined analysis device according to the present invention includes the optical analysis device described above, and a conductivity meter that measures electrical conductivity of the sample or a pH meter that measures pH of the sample.

Such a combined analysis device can achieve the same effects as those achieved by the optical analysis device described above.

According to the present invention described above, in the optical analysis device that analyzes a sample by irradiating an optical cell containing a test solution of the sample with light and detecting the transmitted light, it is possible to make measurements of light across in a wide range of wavelengths, and to further reduce the loss of the energy of the light sources.

DETAILED DESCRIPTION

An optical analysis device 100 according to one embodiment of the present invention will now be explained with reference to drawings.

This optical analysis device 100 according to this embodiment is used in a manner incorporated in a semiconductor manufacturing line, for example, and measures the concentration of a chemical liquid (liquid sample) used in a cleaning process in the semiconductor manufacturing, for example. More specifically, the optical analysis device is an absorption spectrophotometer that measures the concentration of a liquid sample by irradiating the liquid sample with light and measuring the absorbance of the liquid sample. Examples of the chemical liquid include SC-1 (aqueous ammonia-hydrogen peroxide solution), SC-2 (aqueous hydrochloric acid hydrogen peroxide solution), SPM (aqueous sulfuric acid hydrogen peroxide solution), FPM (aqueous hydrofluoric acid hydrogen peroxide solution), and BHF (buffered hydrofluoric acid solution).

Figure 1:
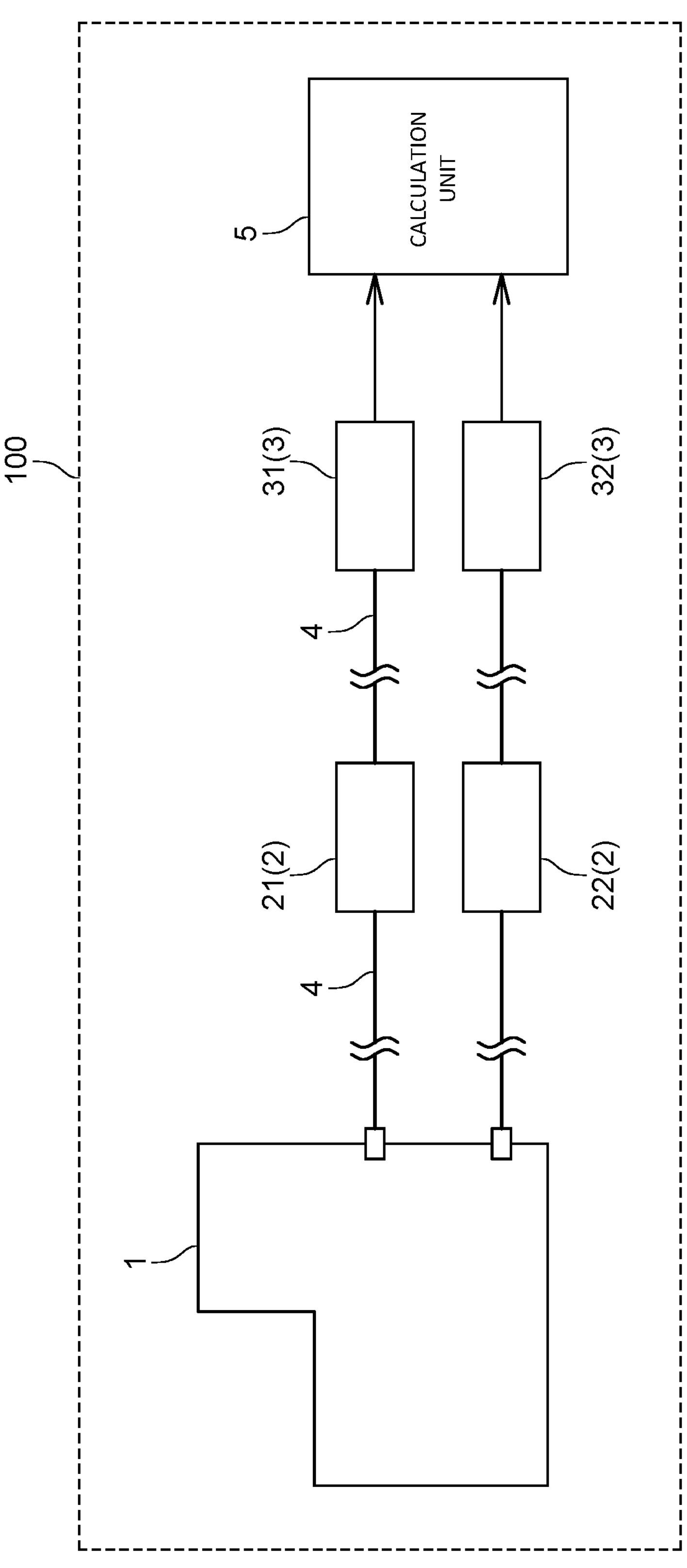
FIG. 1 is a schematic illustrating an overall configuration of an optical analysis device according to one embodiment of the present invention.

Specifically, as illustrated in FIG. 1, the optical analysis device 100 includes a light source unit 1, optical cells 2 connected to the light source unit 1 via light guide mechanisms including optical fibers 4 and the like, photodetectors 3 connected to the optical cells 2 via the respective light guide mechanisms including the optical fibers 4 and the like, and a calculation unit 5. In the optical analysis device 100, a liquid sample such as a chemical liquid is stored in the optical cell 2, and the optical cell 2 is irradiated with the light emitted from the light source unit 1. The light transmitted through the optical cell 2 is detected with the photodetector 3. Upon receiving a light intensity signal from the photodetector 3, the calculation unit 5 calculates the concentration of a predetermined component contained in the liquid sample. The concentration obtained in the manner described above is then used in controlling the concentration or the like of the chemical liquid. The optical cell 2 is, for example, a flow cell provided in a circulation channel formed in chemical liquid piping that is connected to a chemical liquid tank of semiconductor cleaning equipment. The optical cell 2 may be an in-line flow cell, which is incorporated directly into the piping of the semiconductor cleaning equipment. As a material for the optical cell 2, it is preferable to use sapphire when there is a requirement for chemical resistance against hydrofluoric acid or the like. When there is no requirement for chemical resistance, quartz having excellent optical transparency is preferably used. In addition, the optical cell 2 may also be configured to make the wavelength range and absorbance to be measured selectable for each chemical liquid, by changing the cell length.

The optical analysis device 100 according to this embodiment therefore includes two optical cells (first optical cell 21 and second optical cell 22) and two photodetectors (first photodetector 31, second photodetector 32) each having a sensitivity to a different wavelength range, correspondingly to one light source unit 1. Specifically, the light source unit 1 has two light output ports (first light output port 1P1, second light output port 1P2) that output lights in different spectra, and the first optical cell 21 and the second optical cell 22 are irradiated with the lights output from the respective light output ports, via the light guide mechanisms. The beams of light transmitted through the first optical cell 21 and the second optical cell 22 are detected by the first photodetector 31 and the second photodetector 32, respectively, via the light guide mechanisms.

Figure 2:
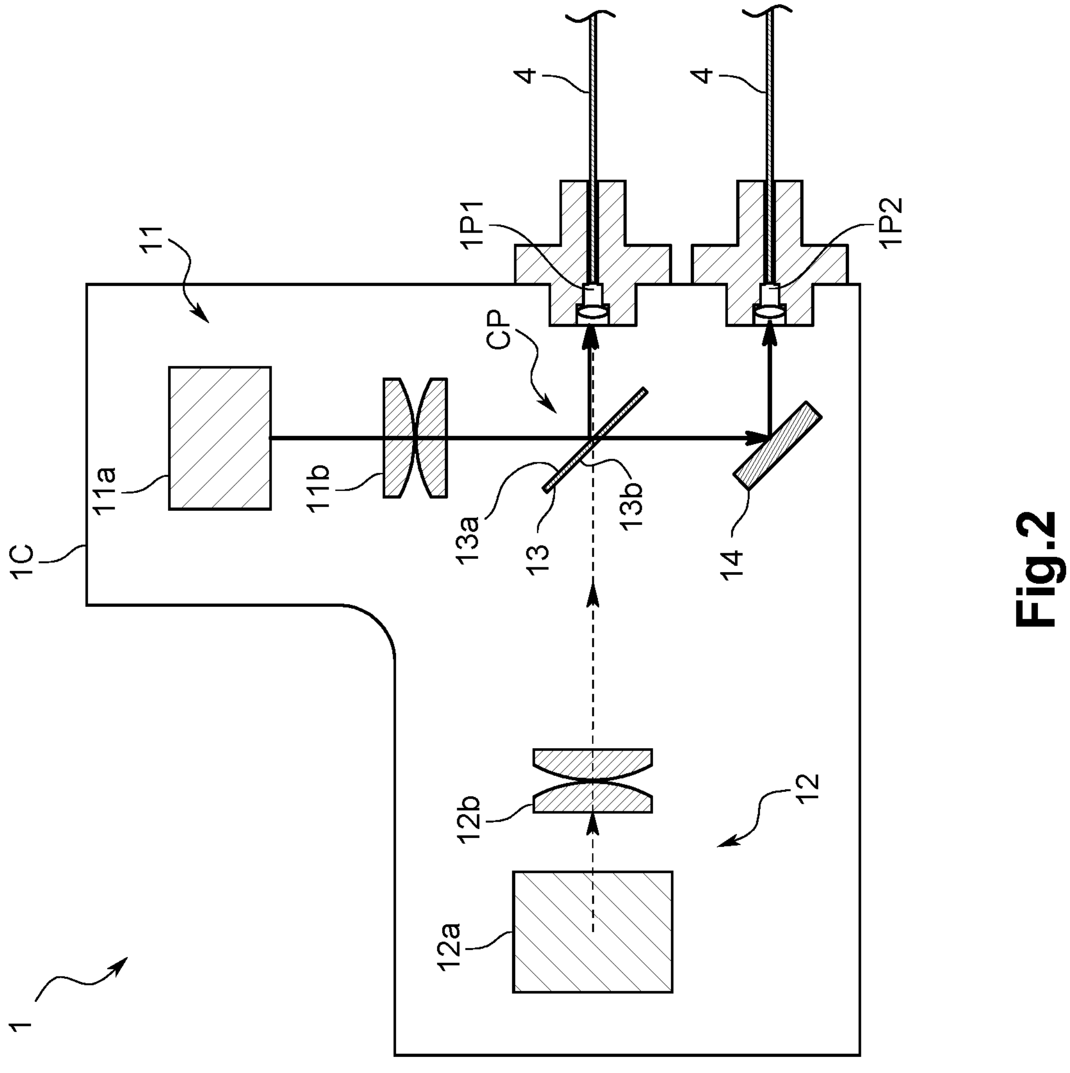
FIG. 2 is a diagram schematically illustrating an internal structure of a light source unit according to the embodiment.

As illustrated in FIG. 2, the light source unit 1 includes a casing 1C, a first light source 11 and a second light source 12 that are housed inside the casing 1C, and each of which emits light in a spectrum that is different from the other, and a plurality of optical elements (first optical element 13, second optical element 14) that transmit and/or reflect the light emitted from the first light source 11 and the second light source 12. Emitting "light in a spectrum that is different from the other" means emitting light having a spectrum that is different from the other in at least a part of the wavelength range, and also includes emitting light having a spectrum that is different from the other in the entire wavelength range. The beams of light emitted from the first light source 11 and the light emitted from second light source 12 are transmitted and reflected by the plurality of optical elements, and guided to the first light output port 1P1 and the second light output port 1P2 provided in a manner facing substantially the same direction, on one side wall of the casing 1C.

Figure 3:
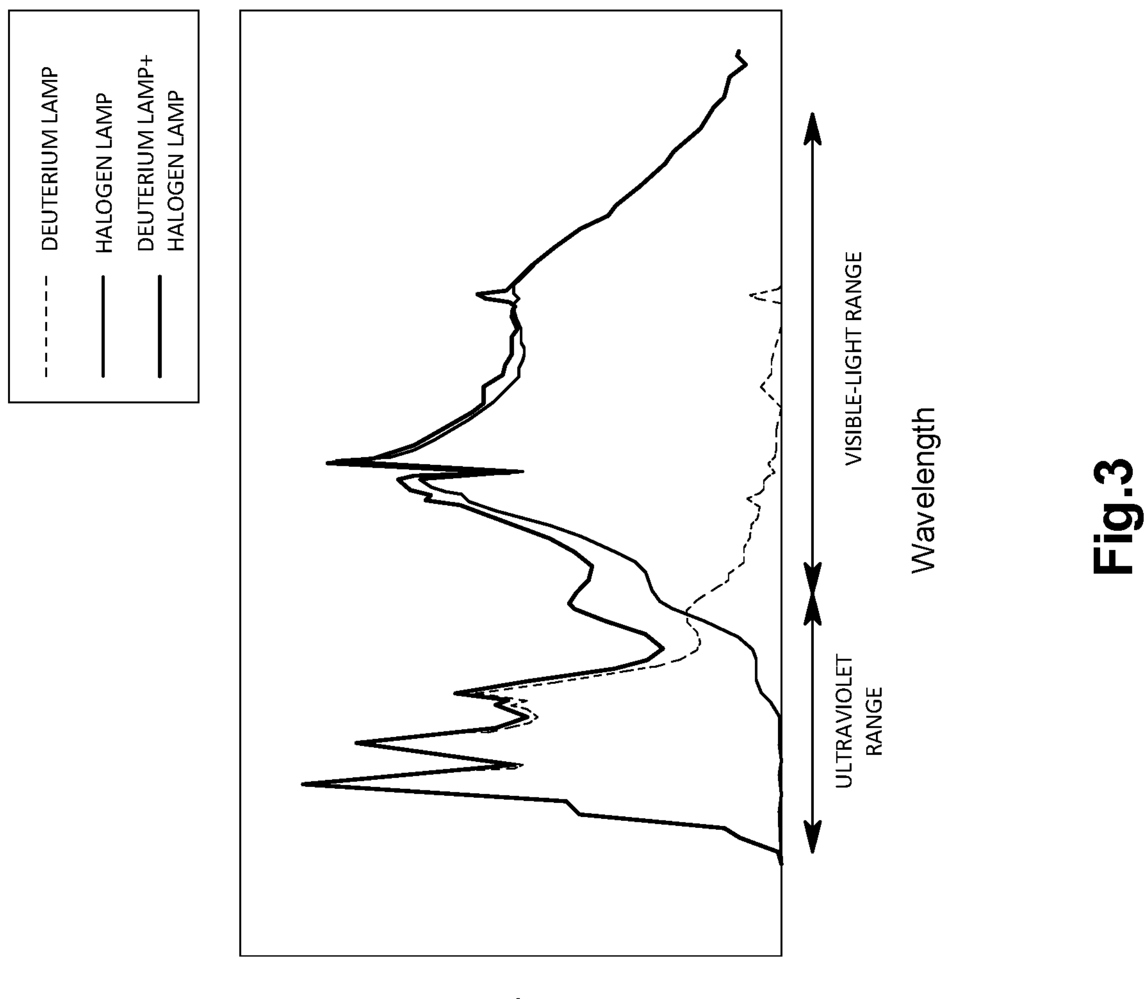
FIG. 3 is a graph illustrating an example of light output spectra of a deuterium lamp and a halogen lamp, in the ultraviolet range and the visible-light range.
Figure 4:
FIG. 4 is a graph illustrating an example of a light output spectrum of a halogen lamp, in the infrared range.

The first light source 11 emits light in a visible-light range to an infrared range having a light output spectrum as illustrated in FIGS. 3 and 4, for example. Specifically, the first light source 11 includes a halogen lamp 11*a* as a light source, and a lens 11*b* that adjusts spread of light emitted from the halogen lamp 11*a*.

The second light source 12 emits light in an ultraviolet range having a light output spectrum as illustrated in FIG. 3, for example. Specifically, the second light source 12 includes a deuterium lamp 12*a* as a light source, and a lens 12*b* that adjusts the spread of light emitted from the deuterium lamp 12*a*.

In the present embodiment, the first light source 11 and the second light source 12 are disposed in such a manner that the paths of the light from the first light source 11 and the light from the second light source 12 intersect each other (e.g., preferably perpendicularly intersect each other, but without limitation thereto) in the casing 1C. In the example explained herein, the optical axes of the lens 11*b* and the lens 12*b* intersect each other. The first optical element 13 is disposed near an intersection CP where the two light paths intersect each other. The first optical element 13 combines the light from the first light source 11 and the light from the second light source 12, and outputs the combined light. More specifically, the first optical element 13 transmits a part of incident light and reflects another part of the incident light, and specifically, is implemented as a non-coated quartz plate.

With the use of a non-coated quartz plate, the first optical element 13 according to this embodiment has an optical property that its transmittance (e.g., about 85% to about 95) is higher than its reflectance (e.g., about 5% to about 15%).

The first optical element 13 has a first face 13*a* irradiated with the light from the first light source 11 and a second face 13*b* irradiated with the light from the second light source 12. The first face 13*a* and the second face 13*b* face directions that are opposite to each other, and are flat surfaces that are parallel to each other. The angle and the position of the first optical element 13 are set in such a manner that the light path of the light emitted from the first light source 11 and reflected by the first face 13*a* (reflected light) is substantially matched with the light path of the light emitted from the second light source 12 and transmitted through the second face 13*b* (transmitted light). In other words, the first optical element 13 combines the reflected light of the first light source 11 and the transmitted light of the second light source 12. A halogen lamp has an optical property that its luminous energy is higher than that of a deuterium lamp, and the first optical element 13 has an optical property that its reflectance is lower than its transmittance, as mentioned above. Therefore, the light emitted from the first light source 11 and reflected on the first face 13*a* of the first optical element 13 and the light emitted from the second light source 12 and transmitted through the second face 13*b* of the first optical element 13 are combined with an appropriate balance of luminous energies. The first light output port 1P1 is provided on the light path of the light thus combined (combined light). The combined light (the light in the ultraviolet range to the infrared range) resultant of combining the reflected light of the first light source and the transmitted light of the second light source, having the light output spectrum illustrated in FIG. 3, is output from the first light output port 1P1.

The second optical element 14, by contrast, is disposed on the light path of the light of the first light source 11, subsequent to transmitting through the first face 13*a* of the first optical element 13. The second optical element 14 is a reflecting mirror 14, such as a flat mirror, having a reflecting surface that reflects the light becoming incident thereto. A second light output port 1P2 is provided on a light path of light emitted from the first light source 11 and reflected on the reflecting mirror 14. The transmitted light (light in the visible-light range to the infrared range) of the first light source 11, having the light output spectrum illustrated in FIG. 4, as an example, is output from the second light output port 1P2. Note that light of the second light source 12 reflected on the second face 13*b* of the first optical element 13 also reaches the second light output port 1P2. However, because the luminous energy of the deuterium lamp is lower than that of the halogen lamp, as described above, and the first optical element 13 has an optical property that its reflectance is lower than its transmittance, most of the light reaching the second light output port 1P2 is the transmitted light of the first light source 11.

The first light output port 1P1 is connected to an end of the optical fiber 4 for guiding the output light to the first optical cell 21, and the second light output port 1P2 is connected to an end of the optical fiber 4 for guiding the output light to the second optical cell 22. As a result, the first optical cell 21 is irradiated with the combined light (light in the ultraviolet range to the infrared range) that is the combination of the reflected light of the first light source 11 and the transmitted light of the second light source 12, being irradiated via the optical fiber 4, and the second optical cell 22 is mainly irradiated with transmitted light (light in the visible-light range to the infrared range) of the first light source 11 via the optical fiber 4.

The photodetector 3 includes a spectroscope or the like that disperses and detects the light transmitted through the optical cell 2. With this photodetector, the optical absorption spectrum (spectroscopic spectrum) of the transmitted light is acquired. Note that the optical absorption spectrum according to this embodiment is a concept including an absorbance spectrum obtained from the optical absorption spectrum of the transmitted light and the optical absorption spectrum of incident light. In the present embodiment, the first photodetector 31 and the second photodetector 32 are linear image sensors implemented using different detection elements, in a manner suitable for the respective light wavelengths to be measured. Specifically, the first photodetector 31 is implemented using a silicon detection element having a sensitive wavelength range in the ultraviolet range and the visible-light range, and the second photodetector 32 is configured to use an InGaAs detection element having a sensitive wavelength range in the infrared range.

With the optical analysis device 100 according to this embodiment having a configuration described above, the light emitted from the first light source 11 (the light in the visible-light range to the infrared range) and reflected by the first face 13*a* of the first optical element 13 and the light emitted from the second light source 12 (the light in the ultraviolet range) and transmitted through the second face 13*b* of the first optical element 13 are combined and guided to the first light output port 1P1. Therefore, it is possible to output the light in the ultraviolet range to the infrared range via the first light output port 1P1, and to irradiate the first optical cell 21 therewith. Furthermore, because the light emitted from the first light source 11 and transmitted through the first face 13*a* of the first optical element 13 is guided to the second light output port 1P2, it is possible to make an effective use of the transmitted light from the first light source 11 (the light in the visible-light range to infrared range) without any waste, and to irradiate the second optical cell 22 with the light.

Because a non-coated quartz plate, which has a transmittance sufficiently higher than its reflectance as an optical property, is used as the first optical element 13, the light source unit 1 can output the combined light (light in the ultraviolet range to the infrared range) at an appropriate luminous energy balance, from the first light output port 1P1, the combining light being a combination of the light emitted from the first light source 11 having a relatively high luminous energy and the light emitted from the second light source having a relatively low luminous energy, and to mainly output the light of the first light source 11 (light in the visible-light range to the infrared range) from the second light output port 12. As a result, it is possible to output light in different spectra, via the first light output port 1P1 and the second optical output 1P2, at appropriate luminous energies.

The light output from the first light output port 1P1 is detected by the first photodetector 31 having a sensitive wavelength range in the ultraviolet range to the visible-light range, and the light output from the second light output port 1P2 is detected by the second photodetector 32 having a sensitive wavelength range in the infrared range. Therefore, it is possible to make measurements across a wavelength range from the ultraviolet range to the visible-light range. FIGS. 3 and 4 illustrate examples of measured spectra of the output light from the output port 1P1 and the output light from the output port 1P2, measurements being made by the first photodetector 31 and the second photodetector 32, respectively.

Note that the present invention is not limited to the embodiment described above.

For example, the first optical element 13 may reflect the light in the visible-light range, and transmit the light in the ultraviolet range and the infrared range, as an optical property, or conversely, may transmit the light in the visible-light range and light in the ultraviolet range and the infrared range as an optical property. Furthermore, the first optical element 13 may have a reflectance higher than a transmittance. In such a case, the positions of the first light source 11 and the second light source 12 or the positions of the first photodetector 31 and the second photodetector 32 are switched.

The first optical element 13 according to the embodiment described above is a quartz plate, but the present invention is not limited thereto. In another embodiment, the first optical element 13 may be a glass plate made of any material such as $CaF_2$ (calcium fluoride), BK7, or sapphire. Furthermore, the first optical element 13 according to another embodiment may be, for example, a polka-dot beamsplitter, a reflective ND filter, a dielectric multilayer film beam splitter.

In the above embodiment, the first light source 11 includes the halogen lamp 11*a* as the light source, but the present invention is not limited thereto. In another embodiment, the first light source 11 may include one or a plurality of LEDs that emit light in the infrared range, and light in the visible-light range, as a light source. In the same manner, the second light source 12 may include one or a plurality of LEDs that emit light in the ultraviolet range, as a light source.

In addition, in the light source unit 1 according to another embodiment, the light sources 11, 12 may emit light of any wavelength ranges, respectively, and the first light output port 1P1 and the second light output port 1P2 may output light of any wavelength ranges, respectively, as long as the first light source 11 and the second light source 12 emit light of different spectra, the first light output port 1P1 outputs the combined light resultant of combining the light of the first light source 11 and the light of the second light source 12 using the first optical element 13, and the second light output port 1P2 outputs the light emitted from the first light source 11 and transmitted through the first optical element 13.

In the above embodiment, the second optical element 14 is disposed on the light path of the light emitted from the first light source and transmitted through the first optical element 13, but the present invention is not limited thereto. It is also possible for the light source unit 1 according to another embodiment not to include the second optical element 14, and for the light emitted from the first light source and transmitted through the first optical element 13 to be directly guided to the second light output port 1P2.

Figure 5:
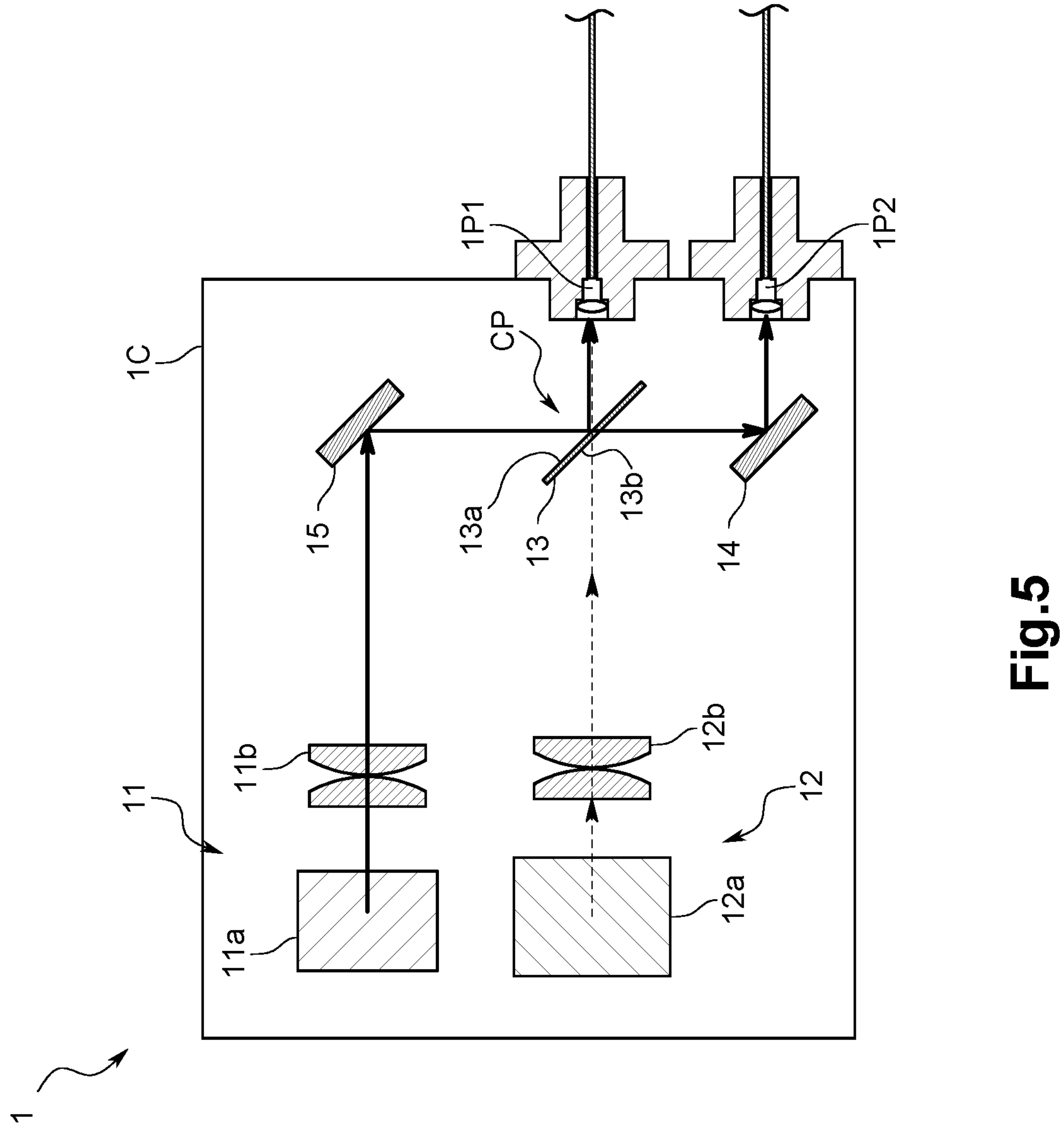
FIG. 5 is a diagram schematically illustrating an internal structure of a light source unit according to another embodiment.

Furthermore, in the above embodiment, the first light source 11 and the second light source 12 are positioned in such a manner that the optical axes of the lenses 11*b*, 12*b* intersect with each other inside the casing 1C, but the present invention is not limited thereto. In another embodiment, for example, as illustrated in FIG. 5, the light emitted from the first light source 11 may be reflected by a third optical element 15 that is a reflecting mirror, and guided to the first optical element 13, and the light emitted from the first light source 11 and the light emitted from the second light source 12 may intersect each other in the first optical element 13. In other words, in the present specification, "disposed in such a manner that the paths of light from the first light source 11 and the second light source 12 intersect each other" means that the light arriving from the first light source 11 and the light arriving from the second light source 12 intersect with each other in the first optical element 13 for combining the light.

In the above embodiment, the first light source 11 and the second light source 12 are disposed in such a manner that the light paths thereof intersect each other, and the first optical element 13 is disposed near the intersection CP, but the present invention is not limited thereto. In the optical analysis device 100 according to another embodiment, positions and orientations of the first light source 11, the second light source 12, and the first optical element 13 may be changed as appropriate, as long as: the first optical element 13 is on the light paths of the light from the first light source 11 and the light from the second light source 12; the first light output port 1P1 is provided on the light path of the light emitted from the first light source 11 and reflected by the first optical element 13, and the light emitted from the second light source 12 and transmitted through the first optical element 13 (more specifically, the light path of the combined light); and the second light output port 1P2 is provided on the light path of the light emitted from the first light source 11 and transmitted through the first optical element 13.

In the above embodiment, the light of the first light source 11 and the light of the second light source 12 are combined in the first optical element 13, but the present invention is not limited thereto. In another embodiment, the light of the first light source 11 and the light of the second light source 12 may be combined after passing through the first optical element 13.

In addition, the optical analysis device 100 according to another embodiment may be a device for analyzing a gas sample such as a gas, without limitation to a device for analyzing a liquid sample such as a chemical liquid. In addition, it is also possible to use a similar device configuration to measure the fluorescence emitted from a sample in the optical cell. In this manner, it is possible to perform wavelength sweeping of the excitation light across a wide range of wavelengths, with one device.

In addition, the optical analysis device 100 described above may be applied to a combined analysis device 400 for measuring the concentration of a predetermined component contained in the liquid sample, using the optical absorption spectrum of the liquid sample and an electrochemically measured property value of the liquid sample. An embodiment of such a combined analysis device 400 will now be explained with reference to FIG. 6.

<Device Configuration>

The combined analysis device 400 measures the concentration of a measurement target component contained in a liquid sample such as a chemical liquid used in semiconductor manufacturing equipment, for example. The combined analysis device 400 is inserted to chemical liquid piping for supplying the chemical liquid, for example, and measures the concentration of a measurement target component of the chemical liquid. The concentration thus obtained is then used in controlling the concentration or the like of the chemical liquid. The chemical liquid is a mixed chemical liquid (mixed sample) of two or more components, and includes, for example, a component coming to have electrical conductivity at the time of dissolution, a component not coming to have electrical conductivity, or a component correlated with hydrogen ions (H+).

Figure 6:
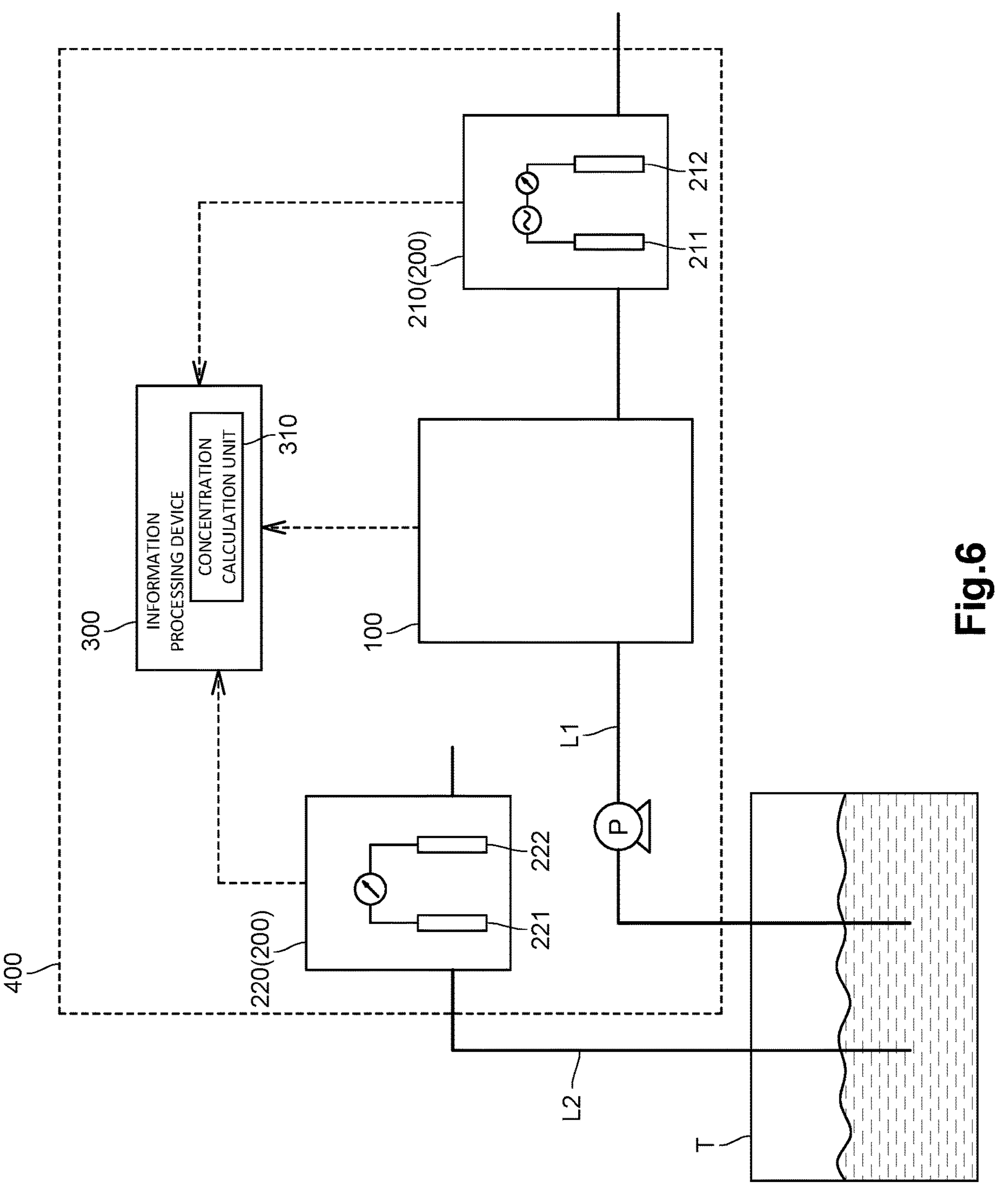
FIG. 6 is a diagram illustrating an overall configuration of a combined analysis device including the optical analysis device according to the embodiment.

Specifically, as illustrated in FIG. 6, the combined analysis device 400 includes an optical measurement unit (specifically, the optical analysis device) 100 for measuring an optical absorption spectrum of a liquid sample, an electrochemical measurement unit 200 for electrochemically measuring a property value of the liquid sample, and an information processing device 300 for processing measurement information obtained by the optical measurement unit 100 and the electrochemical measurement unit 200. The property value is a physical property value having a correlation with the concentration of the measurement target component, contained in the liquid sample.

The optical measurement unit 100 is an absorptiometer that measures the absorbance of the liquid sample, by irradiating the liquid sample with light, as described above. The optical cell 2, which is housed inside the optical measurement unit 100, is provided to a first sample line L1 formed by chemical liquid piping (not illustrated) connected to a chemical liquid tank T of the semiconductor manufacturing equipment, for example. Note that the first sample line L1 may be connected either to the first optical cell 21 or the second optical cell 22 depending on the type of the measurement target component.

The electrochemical measurement unit 200 according to this embodiment includes a conductivity meter 210 that measures the conductivity (electrical conductivity) of the liquid sample and a pH meter 220 that measures pH of the liquid sample.

Specifically, the conductivity meter 210 applies an AC voltage between two electrodes 211, 212, and measures the conductivity (electrical conductivity) of the liquid sample based on the current flowing therethrough. The conductivity meter 210 according to this embodiment is provided to the first sample line L1 where the optical measurement unit 100 is provided, on the upstream or downstream side of the optical measurement unit 100. Note that the conductivity meter 210 may an AC four-pole conductivity meter or an electromagnetic induction conductivity meter, as well as an AC two-pole conductivity meter. The conductivity meter 210 may be provided to a sample line other than the first sample line L1.

The pH meter 220 measures pH of the liquid sample based on the potential difference formed between a pH glass electrode (working electrode) 221 and a reference electrode 222. The pH meter 220 according to this embodiment is provided in a second sample line L2 formed by chemical liquid piping (not illustrated) connected to the chemical liquid tank 5, separately from the first sample line L1. The pH meter 220 may also be provided to the same first sample line L1, on the upstream side or the downstream side of the optical measurement unit 100, for example.

The information processing device 300 calculates the concentration of the measurement target component of the liquid sample, using the optical absorption spectrum (or absorbance spectrum) obtained by the optical measurement unit 100, the electrical conductivity obtained by the conductivity meter 210, and the pH obtained by the pH meter 220. Note that the information processing device 300 is a computer including a CPU, a memory, an input/output interface, an AD converter, and an output unit such as a display, and an input unit such as a keyboard. The CPU and the peripheral devices cooperate one another to exert a function as the concentration calculation unit 310, based on a component concentration calculation program stored in the memory.

Specifically, the concentration calculation unit 310 calculates the concentration of the measurement target component through multivariate analysis that uses the optical absorption spectrum and the property values (electrical conductivity and pH) as explanatory variables. As the multivariate analysis, multiple regression analysis (MLR or ILS), principal component regression analysis (PCR), least squares method (CLS), partial least squares method (PLS (PLS1 or PLS2)), and the like may be used.

The concentration calculation unit 310 calculates the first-order derivative or the second-order derivative of the optical absorption spectrum, and performs multivariate analysis using the derivative as an explanatory variable. In addition, the concentration calculation unit 310 performs multivariate analysis using the value of each of the plurality of wavelengths in the optical absorption spectrum as an explanatory variable.

Specifically, the concentration calculation unit 310 calculates the concentration of the measurement target component through the multivariate analysis using the following formula.

[Equation 1]

$$\begin{aligned} C(\text{Concentration}) &= \sum_{i=1}^{n}(a_i(\text{Coefficient}) \times Abs_i(\text{Absorbance})) + \\ &\quad b(\text{Coefficient}) \times EC(\text{Electrical Conductivity}) + \\ &\quad c(\text{Coefficient}) \times \text{pH} + R(\text{Residual Term}) \\ &= (a_i, b, c, R) \cdot \begin{pmatrix} Abs_i(\text{Absorbance}) \\ EC(\text{Electrical Conductivity}) \\ \text{pH} \\ R(\text{Residual Term}) \end{pmatrix} \\ &= k \cdot S \end{aligned}$$

Where $Abs_i$ (absorbance) is obtained by taking a derivative of the optical absorption spectrum, and corresponds to a value of each of a plurality of wavelengths (λ1, λ2, . . . μn).

The coefficients $a_i$ is a concentration regression coefficient for the wavelength λi; the coefficient b is a concentration regression coefficient for the electrical conductivity; and the coefficient c is a concentration regression coefficient for pH. Note that the concentration regression coefficient corresponds to the weight of each explanatory variable.

k is a calibration curve obtained in advance, and S is measurement data (actual measurement data) of the liquid sample, collected with the optical measurement unit 100 and the electrochemical measurement unit 200. The calibration curve is obtained by performing multivariate analysis using the above equation, on the measurement data of a reference sample having a known concentration, the measurement data collected by the optical measurement unit 100 and the electrochemical measurement unit 200.

When the absorbance and the electrical conductivity are to be used as two explanatory variables, zero may be set to the pH term in Equation 1 above, and when the absorbance and the pH are to be used as two explanatory variables, zero may be set to the electrical conductivity term in Equation 1 above.

In addition, various modifications and combinations of the embodiment may also be made within the scope not deviating from the gist of the present invention.

REFERENCE SIGNS LIST

100 optical analysis device
1 light source unit
11 first light source
12 second light source
13 first optical element
1P1 first light output port
1P2 second light output port
2 optical cell
3 photodetector
CP intersection

What is claimed is:

1. An optical analysis device that analyzes a sample by irradiating an optical cell containing the sample with light, and detecting light transmitted through the optical cell, the optical analysis device comprising:

a first light source and a second light source each emitting light in a spectrum different from a spectrum of another;

an optical element that reflects a part and transmits another part of incident light that has a first face on which the light from the first light source becomes incident and a second face on which the light from the second light source becomes incident;

a first light output port provided on a light path of light emitted from the first light source and reflected on the first face, and light emitted from the second light source and transmitted through the second face; and a second light output port provided on a light path of light emitted from the first light source and transmitted through the first face, wherein the lights emitted from the first light output port and the second light output port toward the optical cell have mutually different spectra.

2. The optical analysis device according to claim 1, wherein one of the first light source and the second light source emits light at a higher intensity than an intensity of light from the other.

3. The optical analysis device according to claim 1, wherein one of the first light source and the second light source includes a halogen lamp as a light source, and the other includes a deuterium lamp as a light source.

4. The optical analysis device according to claim 3, wherein one of the first light source and the second light source emits light in a visible-light to infrared wavelength range, and the other emits light in an ultraviolet wavelength range.

5. The optical analysis device according to claim 1, wherein the optical element has a reflectance higher than a transmittance, or a transmittance higher than a reflectance, in wavelength ranges of the light emitted from the first light source and the second light source.

6. The optical analysis device according to claim 1, wherein the optical element is implemented as a non-coated quartz plate.

7. The optical analysis device according to claim 1, wherein the first light output port and the second light output port are provided facing substantially an identical direction.

8. The optical analysis device according to claim 1, further comprising:

a first optical cell and a second optical cell irradiated with light output from the first light output port and light output from the second light output port, respectively; and a first photodetector and a second photodetector that detect light transmitted through the first optical cell and the light transmitted through the second optical cell, respectively, and each of which has a sensitive wavelength range different from a sensitive wavelength range of another.

9. A combined analysis device that measures a concentration of a measurement target component in a sample, the combined analysis device comprising:

an optical analysis device according to claim 1;

a conductivity meter that measures an electrical conductivity of the sample, or a pH meter that measures pH of the sample; and a concentration calculation unit that calculates the concentration of the measurement target component by performing a multivariate analysis that uses an optical absorption spectrum of the sample, the optical absorption spectrum being measured by the optical analysis device, and the electrical conductivity or pH of the sample, the electrical conductivity or the pH being measured by the conductivity meter or the pH meter, as explanatory variables.

* * * * *